(12) United States Patent
Op 'T Eynde et al.

(10) Patent No.: US 6,703,896 B2
(45) Date of Patent: Mar. 9, 2004

(54) METHOD AND DEMODULATOR FOR FSK DEMODULATION, AND RECEIVER INCLUDING SUCH A DEMODULATOR DEVICE

(75) Inventors: Frank Nico Lieven Op 'T Eynde, Wilsele (BE); Jan Frans Lucien Craninckx, Boutersem (BE)

(73) Assignee: Alcatel, Paris (FR)

( * ) Notice: Subject to any disclaimer, the term of this patent is extended or adjusted under 35 U.S.C. 154(b) by 244 days.

(21) Appl. No.: 10/026,456

(22) Filed: Dec. 27, 2001

(65) Prior Publication Data

US 2002/0121927 A1 Sep. 5, 2002

(30) Foreign Application Priority Data

Dec. 28, 2000 (EP) .............................. 00403708

(51) Int. Cl.[7] .............................. H03D 3/00; H04L 27/14
(52) U.S. Cl. ...................... 329/300; 329/302; 329/303; 375/334
(58) Field of Search ................ 329/300–303; 375/324, 325, 334–337

(56) References Cited

U.S. PATENT DOCUMENTS 4,291,275 A * 9/1981 Nossen ...................... 329/303
4,612,509 A   9/1986 Betts et al.
4,647,864 A   3/1987 Rafferty et al.
5,640,428 A   6/1997 Abe et al.
5,949,829 A   9/1999 Kawai
6,038,268 A   3/2000 Kawai

FOREIGN PATENT DOCUMENTS

CA              1175490 A        10/1984

* cited by examiner

*Primary Examiner*—David C. Mis
(74) *Attorney, Agent, or Firm*—Sughrue Mion, PLLC

(57) ABSTRACT

In a method for demodulating an analog FSK signal (FSKin), a current sample $(Id(k); Id_i)$ of the downconverted and digital inphase component is multiplied with a previous sample $(Qd(k-1); Qd_{i-1})$ of the downconverted an digital orthogonal phase component. The product thereof is subtracted from the product obtained by multiplying a current sample of said orthogonal phase component $(Qd(k); Qd_i)$ with a previous sample $(Id(k-1); Id_{i-1})$ of said inphase component. Said current and said previous samples of said inphase and said orthogonal phase components are spaced apart by the digital baseband signal period. In a variant method said current sample and said previous sample of said inphase and orthogonal phase component are spaced apart by an integer fraction (n) of said digital baseband signal period, whereby the steps of said method are repeated, thereby further adding consecutive values of the result $R_i$). A demodulator for performing this method and a receiver including such a demodulator are described as well.

13 Claims, 4 Drawing Sheets

Figure 1:
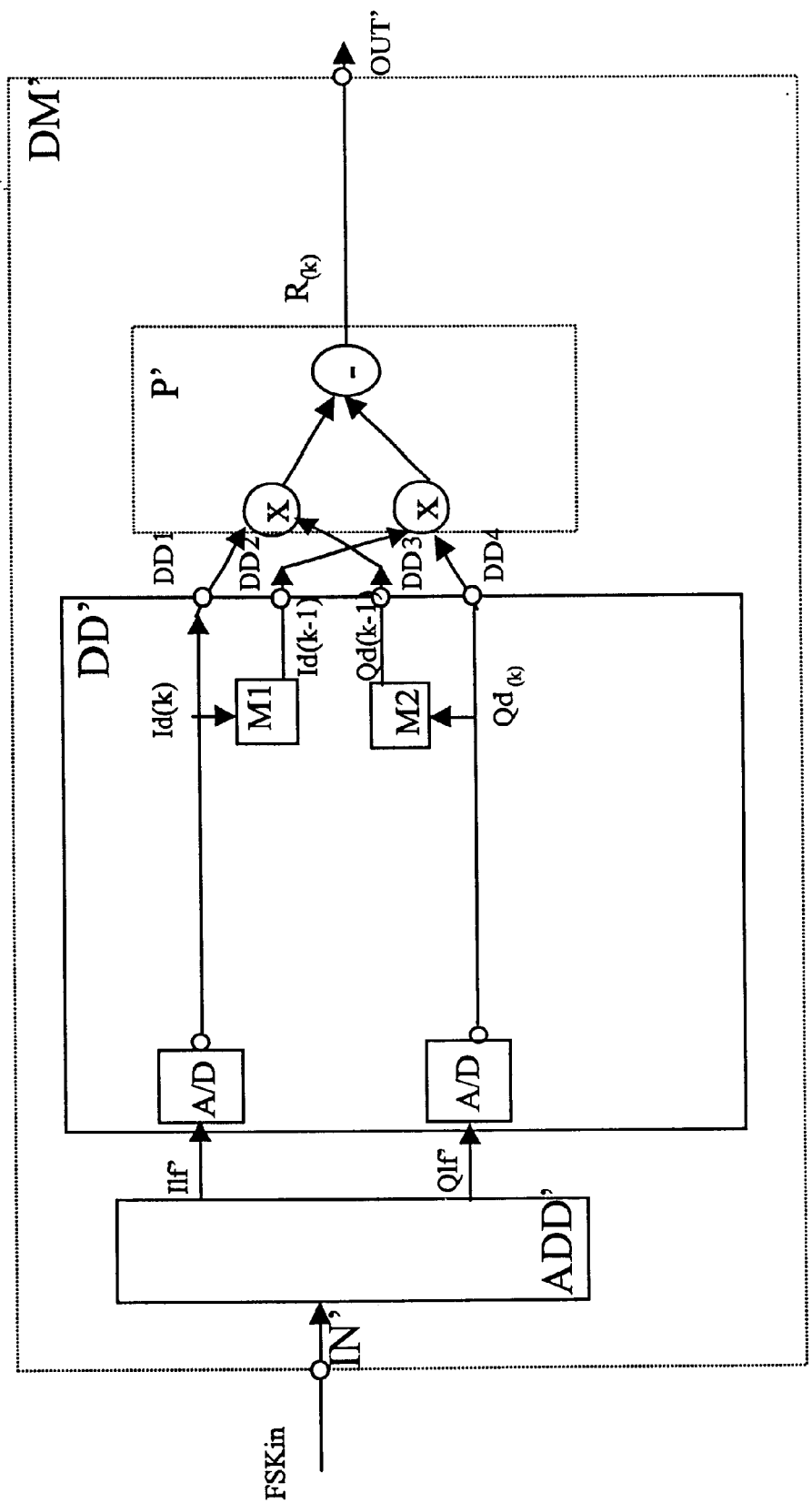

METHOD AND DEMODULATOR FOR FSK DEMODULATION, AND RECEIVER INCLUDING SUCH A DEMODULATOR DEVICE

The present invention relates to a method for demodulation of FSK signals and a demodulator for performing such a method, as are respectively described in the non-characterizing portion of claim 1 and claim 7.

Such a method and device are already known in the art, e.g. from "U.S. Pat. No. 6038268". Therein, a direct conversion FSK signal radio receiver is shown whereby, after having deduced from the received signal, the separated two-axis components, processing is done on these components. This operation thereby consists of a differentiation and a multiplication with the other, non-differentiated component, the results of both multiplications then being subtracted such as to obtain the demodulated signal.

A drawback of this method is however its sensitivity to noise.

Indeed, by operating on the instantaneous value of the incoming signal, and its deduced components, the demodulation method is perturbated by all noise present in the baseband signals. As a consequence the instantaneous frequency represented by the two noisy baseband signals differs strongly from the one represented by the noise-free signals.

An object of the present invention is to provide a method and a device of the above known type but which is less sensitive to noise According to the invention, this object is achieved due to the fact that said method includes the steps as described in the characterising portion of claim 1 and that said device is further adapted as is described in the characterising portion of claim 7.

In this way, noise immunity is obtained in two ways: firstly the signal is digitized, allowing for more accurate processing on the digital signal, and secondly the mathematical operation is performed at samples which are spaced apart in the time by the symbol transmission period, instead of by an infinitesimally small distance, as in the prior art. Thereby all noise present at frequencies higher than the symbol transmission speed is averaged out.

Another characteristic feature of the present invention is described in claims 2 and 8.

Thereby, further non-linearities, are thereby alleviated, while still suppressing the noise. The latter is realised by the summation, which as a matter of fact, corresponds to an integration filter function. This will be clearly shown in the describing portion of this document.

By further sampling the resulting symbol stream at the baseband symbol rate, the thus generated output stream corresponds to a more accurate demodulated signal, at the correct rate.

The present invention relates as well to a receiver which includes a demodulator device as is described in the claim 10.

Further characteristic features of the present method and receiver are mentioned in claims 4 and 11.

Offset present in the demodulated symbols is thereby detected and eliminated. By further tuning the local oscillator frequency with the thus obtained offset value, as is mentioned in claims 6 and 13, the offset removal is thereby further improved.

Figure 2:
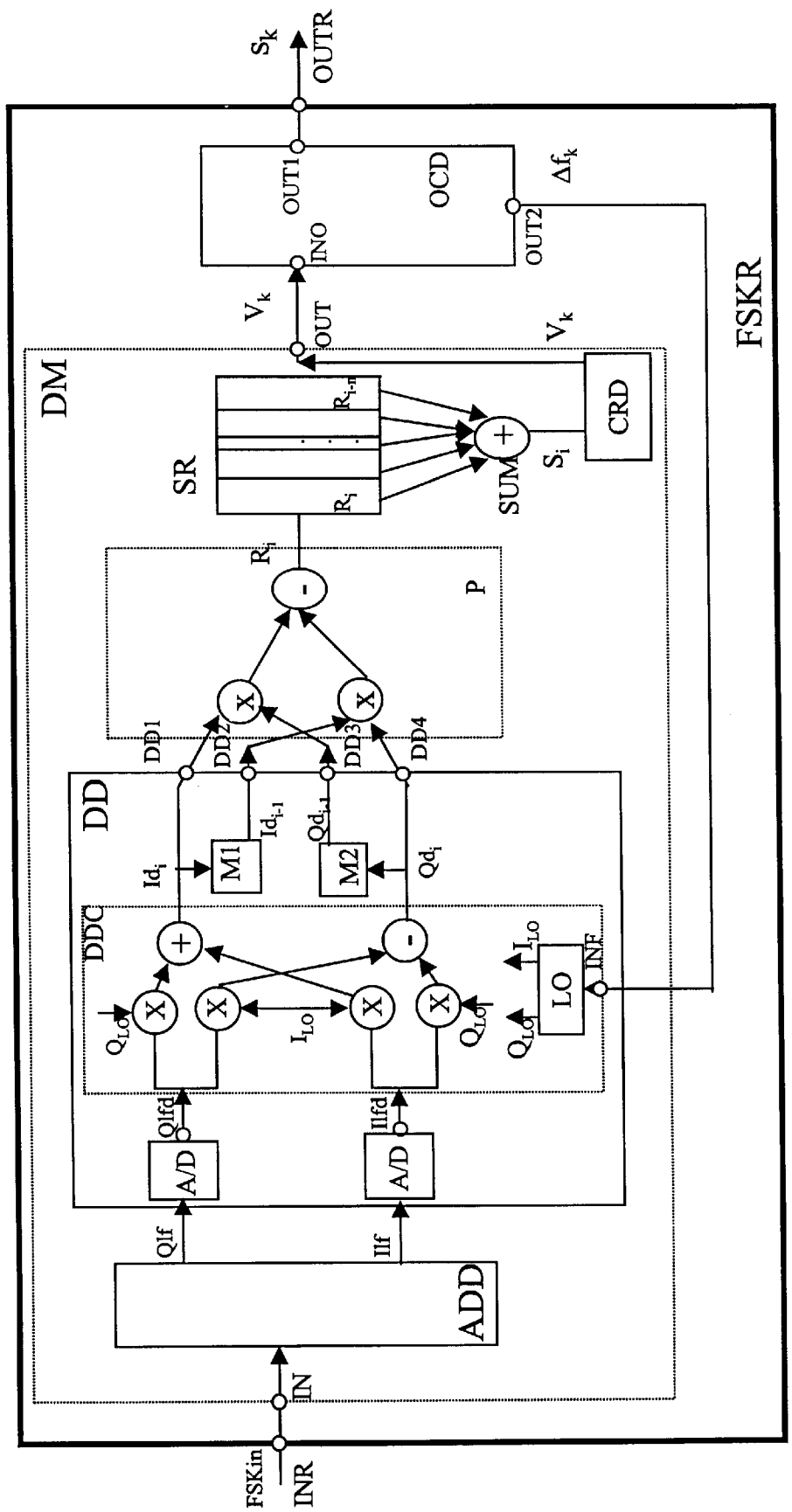
Figure 3B:
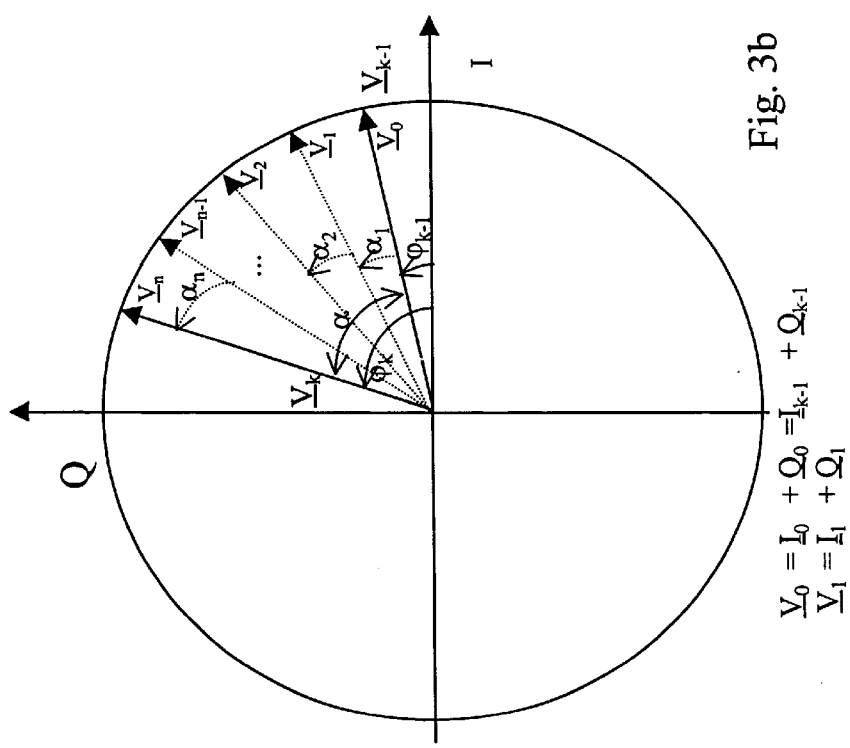
Figure 3A:
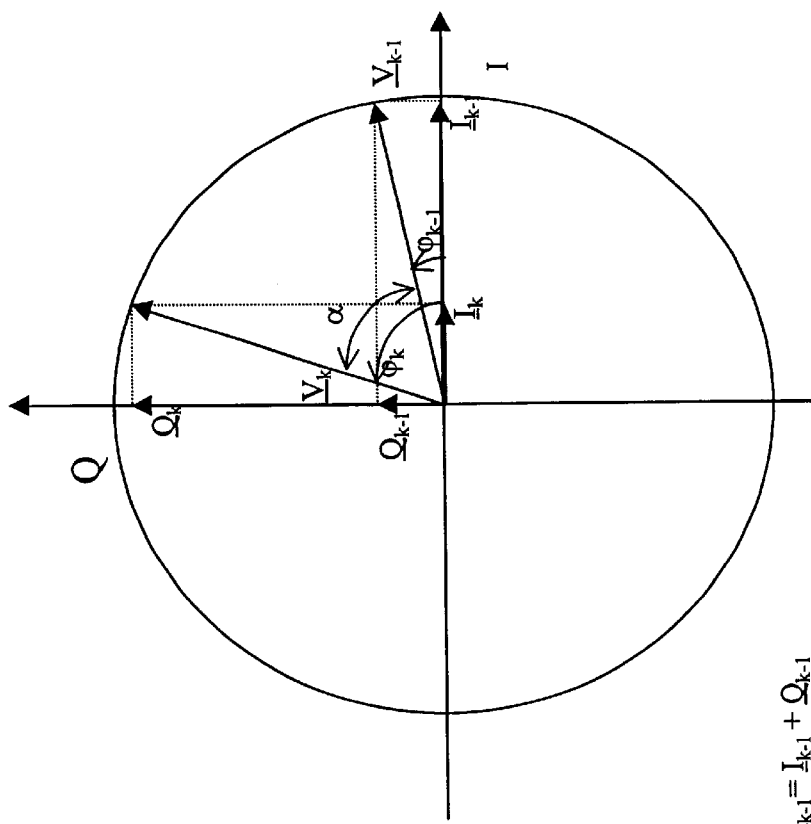
Figure 4:
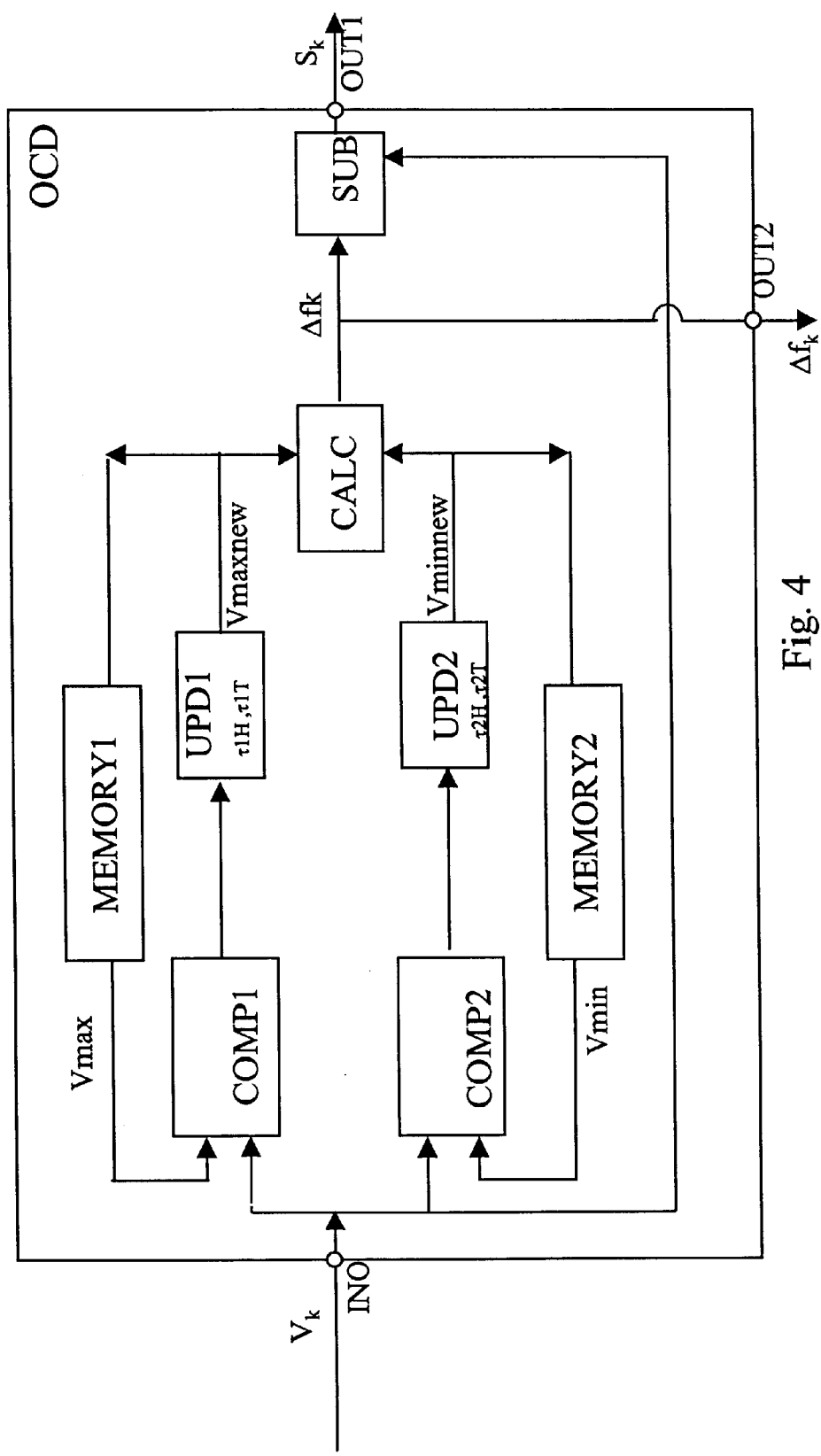

The above and other objects and features of the invention will become more apparent and the invention itself will be best understood by referring to the following description of an embodiment taken in conjunction with the accompanying drawings wherein:

FIG. 1 represent a block scheme of a first embodiment of a demodulator according to the invention FIG. 2 represents a block scheme of an FSK receiver including another embodiment of a demodulator according to the present invention, FIG. 3*a* represents the principal mathematical operation of the demodulator device of FIG. 1, FIG. 3*b* represents the principal mathematical operation of the demodulator of FIG. 2, and FIG. 4 represents a detailed view on the offset correction device OCD included in the receiver of FIG. 2.

The present invention is directed to a method for demodulation in an FSK (Frequency Shift Keying) signal radio receiver. Referring to FIG. 2, there is shown a block diagram of the main part of an FSK receiver FSKR, according to one embodiment of this invention. This FSK receiver includes an input terminal INR, which is adapted to receive an FSK signal from an antenna of the receiver. This high-frequency FSK signal, for instance having a frequency of 2.4 GHz, as for Bluetooth applications, is conducted to the input terminal IN of the demodulator DM of the receiver FSKR. This demodulator includes an analog downconversion device ADD which is adapted to perform a first downconversion step on the incoming signal to a lower frequency. In the embodiment depicted in FIG. 2, this represents an intermediate frequency, but in another embodiment, for instance the one shown in FIG. 1, this may as well consist of a downconversion to an analog baseband signal. In FIG. 1, the analog downconversion device is denoted ADD'. This method of full analog downconversion was also described in the already mentioned prior art document. The first downconversion can also be done to a non-zero intermediate frequency, resulting in a receiver embodiment as depicted in FIG. 2. For Bluetooth applications for example, an intermediate frequency of 1 MHz or higher is chosen. In any case, the analog downconversion devices ADD and ADD' are further adapted to deliver two orthogonal analog components of this lower frequency analog signal. These two analog components are respectively denoted QIf and IIf in FIG. 2 and QIf' and IIf' in FIG. 1. These serve as input signals to a digitisation device. The digitisation device DD of FIG. 2 is adapted to perform an analog/digital conversion on these input signals, such as to obtain two respective components of a digital lower frequency signal QIfd and IIfd. In the embodiment depicted in FIG. 2, these two digital components are further digitally downconverted within a digital downconversion device DCC. This is performed by mixing them digitally with the two orthogonal components $I_{LO}$ and $Q_{LO}$, generated by a numerically controlled oscillator, denoted LO. For Bluetooth applications, the frequency of this local oscillator is thus 1 MHz. Following equations apply, as can be deduced from FIG. 2:

$$I_d = I_{LO} \cdot IIfd + Q_{LO} \cdot QIfd$$
$$= \cos(\omega_{LO} \cdot \Delta t) \cdot \cos(\omega_{LF} \cdot \Delta t) + \sin(\omega_{LO} \cdot \Delta t) \cdot \sin(\omega_{LF} \cdot \Delta t)$$
$$= \cos((\omega_{LO} - \omega_{LF}) \cdot \Delta t)$$
$$= \cos(\omega_m \cdot \Delta t)$$

$$Q_d = I_{LO} \cdot QIfd - Q_{LO} \cdot IIfd$$
$$= \cos(\omega_{LO} \cdot \Delta t) \cdot \sin(\omega_{LF} \cdot \Delta t) - \sin(\omega_{LO} \cdot \Delta t) \cdot \cos(\omega_{LF} \cdot \Delta t)$$
$$= \sin((\omega_{LO} - \omega_{LF}) \cdot \Delta t)$$
$$= \sin(\omega_m \cdot \Delta t)$$

which, according to the principles of FSK modulation, corresponds to the two othogonal components of the sampled analog baseband signal.

In the alternative embodiment of FIG. 1, where QIf and IIf were already the components of the analog baseband signal, the digitisation device DD' of FIG. 1 then merely includes the two A/D converters for obtaining the orthogonal components of the digital baseband signal Qd and Id.

The thus obtained digital signals are denoted Qd and Id. Qd(k) and Id(k) thereby respectively represent the k-th sample of these components. In one variant of the method, which is realised by the embodiment of the demodulator DM' represented in FIG. 1, two successive sample pairs, Qd(k) and Qd(k−1) and Id(k) and Id(k−1), of these signal are separated from each other by the baseband symbol period. The digitisation device DD' therefore includes, apart from the two A/D converters, two memory registers M1 and M2, which are adapted to store previous values of the respective signal components. At a certain moment k, four signals are thus delivered by DD': the k-the sample of Qd and Id, as well as the (k−1)-th sample of these signals. These four samples are provided at the baseband symbol period rate at the four respective output terminals of DD', which are denoted DD1' to DD4'.

In a next part of the demodulator DM', the actual symbol recovery takes place based on these four components. This part is denoted P' and includes, two digital multipliers, denoted MP1' and MP2', and a subtraction device denoted SUB'. The following mathematical operation is thereby performed:

$$R(k) = Qd(k) \cdot Id(k-1) - Id(k) \cdot Qd(k-1)$$

This expression is mathematically depicted in FIG. 3a. Therein Vk and Vk−1 respectively denote the k-th and the (k−1)-th FSK baseband vector. Following the general principles of FSK modulation, the two Cartesian components respectively correspond to $I(k)=A\cos(\omega_m.k.\Delta t)$ and $Q(k)=A\sin(\omega_m.k.\Delta t)$ for the k-th sample of this baseband vector. If we denote $\Phi k=\omega_m.k.\Delta t$ and $\Phi k-1=\omega_m.(k-1).\Delta t$, then the aforementioned equation can as well be described as $$R(k) = A\,\sin(\varphi_k) \cdot A\,\cos(\varphi_{k-1}) - A\,\sin(\varphi_{k-1}) \cdot A\,\cos(\varphi_k)$$
$$= A^2\,(\sin(\varphi_k) \cdot \cos(\varphi_{k-1}) - \cos(\varphi_k) \cdot \sin(\varphi_{k-1}))$$
$$= A^2\,\sin(\varphi_k - \varphi_{k-1})$$
$$= A^2\,\sin(\alpha)$$

whereby this angle $\alpha$ is proportional to the frequency $\omega m$ by the equation $\alpha = \omega m \cdot \Delta t$, $\Delta t$ being the difference in time between sample k and sample k−1. For sufficiently small angles, $\sin(\alpha)$ approximates $\alpha$, and the result R(k) is thus proportional to the modulation frequency $\omega_m$, which contains the symbol information.

For a binary FSK signal a "1" is for instance transmitted by setting $\omega_m>0$, and a "0" implies $\omega_m<0$, or vice versa. The demodulator DM', which thus must determine the value of $\omega_m$ in order to recover the transmitted bit sequence from the received signal, is able to do this from the value of R(k) by means of a logic device (not shown in FIG. 1) which is coupled between the processor means P' and the output terminal OUT'.

For binary FSK, a result R(k) larger than zero thus means a positive $\omega_m$, and thus a binary "1" is detected. A result R(k) smaller than zero means a negative $\omega_m$, and thus a binary "0" is detected.

For digital data with a bitrate 1/Tb, Tb being the period between two successive bits, the most straightforward way is thus to take the aforementioned operation of the current vector and the one Tb seconds earlier, whereby $\Delta t=Tb$. This gives the biggest angle, and thus the biggest signal. This is more robust to the presence of noise on the received signal, compared with the aforementioned prior art solution which acts on instanteneous values of the signal, and whereby $\Delta t$ is thus infinitesimally small. For binary FSK, where only the sign of the sinus is important, this is a sufficient solution.

It is however to be remarked that for other FSK schemes, such as 4-FSK, it is not only the sign of the angle $\alpha$ which is important, but also its value. If the period Tb is too large, the non-linearity introduced by approximating $\alpha$ by its sine value, can therefore be intolerable. In that case, in order to linearize the relationship between the result R(k), and $\omega_m$, one can oversample the I and Q signals. Generally this occurs in the A/D converters which thus oversample the incoming QIf and IIf signal. The embodiment used for performing this variant method, as well as the signals used, is depicted in FIG. 2. For n being this oversampling factor, meaning that per period Tb, n samples are taken, an additional shift register and summation operation is performed, respectively by SR and SUM. Following successive samples can then be taken: $R_i, \ldots, R_{i-n}$ whereby, compared to the embodiment of FIG. 1, R(k) of FIG. 1 corresponds to the n-th sample Ri of FIG. 2, and whereby R(k−1) of FIG. 1 corresponds to the first sample $R_{i-n}$ of FIG. 2. These samples are then summed within SUM, as to again obtain a more linearized version of the vector product since the angles $\alpha_i$ are much smaller than the total angle, and since in this case, the sinus much better approximates the angle itself. Indeed, referring to FIG. 3b, where the principles of this variant method are explained, following results $R_1$ to $R_n$ are obtained:

$$R_1 = Q_1 \cdot I_0 - Q_0 \cdot I_1 = A^2\,\sin(\alpha_1)$$
$$R_2 = Q_2 \cdot I_1 - Q_1 \cdot I_2 = A^2\,\sin(\alpha_2)$$
$$\ldots$$
$$R_n = Q_n \cdot I_{n-1} - Q_{n-1} \cdot I_n = A^2\,\sin(\alpha_n)$$

$$R(k)=\Sigma R_i=\Sigma(A^2\,\sin\,(\alpha_i))\approx A^2 \cdot \alpha_k$$

Which thus represents a better approximation of the to be recovered symbol, since the individual angles $\alpha_i$ are smaller resulting in a better sine approximation.

It is to be remarked that, because of the oversampling at the A/D converter, the shift register received a continuous stream of results $R_i$ of the oversampled signal, and that the summation device generates a stream of data, denoted $S_i$, of which only at certain instances, separated from each other by the symbol period, a relevant sample corresponds to the correct demodulated symbol. To solve this problem, a sampling operation performed by and triggered by a clock recovery device CRD is to be included within the demodulator. This clock recovery device is adapted to generate, based on the oversampled data stream generated by SUM, a clock for clocking the sampling operation. The latter, also performed by CRD, will result in only sampling these sums which correspond to the correct symbol, and to provide them to the output terminal OUT of the demodulator device. The resulting data stream is denoted $V_k$, and thus includes a stream of demodulated samples at the symbol period, which are directly proportional to the symbol values $\alpha_k$.

In the first variant of the method, the resulting samples R(k) approximate the samples $V_k$ of the second variant of the method. For this first variant, it is also mandatory to have clock recovery devices such that the data are sampled at the right moment, for instance in the A/D convertor. In this case the A/D convertor thus also has to include a clock recovery unit. In order not to overload the drawing, this is not shown in FIG. 1.

Since embodiments of clock recovery units and clock recovery devices as described above in this document, are well known to a person skilled in the art, these will not be further discussed in this document since they do not represent an essential part of this invention.

The FSK receiver device FSKR of FIG. 2 further includes an offset detection and correction device, denoted OCD, which is adapted to determine from the demodulated symbol stream $V_k$, an offset error, denoted $\Delta f_k$, and to correct the symbol stream such as to obtain a corrected output symbol stream, denoted $S_k$, for provision to the output terminal OUTR of the FSK receiver device OUTR. A more detailed scheme of one embodiment of the offset detection and correction device is shown in FIG. 4.

The principle of this offset detection consists of tracking the minimum and the maximum of the input signal, i.e. the incoming symbol stream $V_k$. The offset of this symbol stream is thus denoted $\Delta f_k$, and is calculated as the average between the latest value of the tracked maximum, denoted as Vmaxnew, and the latest value of the tracked minimum, denoted Vminnew. Compared to the methods where merely the average of a series of values of the data stream is used for calculating the offset, this method has the advantage that it is also applicable for data streams where the number of "1" values is different from the number of "0" values, such as is the case for Bluetooth applications. Moreover, this method is also faster than the aforementioned methods.

The values of the current minimum and the current maximum, which are respectively denoted as Vmin and Vmax, are thereby continuously updated, based on the incoming data. This takes place in two comparators, COMP1 and COMP2, which respectively compare the current value of the maximum, respectively the current value of the minimum, with the incoming data. Upon detecting that $V_k$>Vmax, COMP1 will generate a control signal to a first update device UPD1, which will accordingly update Vmax with this $V_k$ value. If $V_k$<=Vmax, Vmaxnew will remain the old Vmax. In case of a new value, this will replace the old value within the memory. The same operation takes place for Vmin: the incoming data Vk is compared with the actual value Vmin, and, in case Vk is lower than Vmin, the latter is updated within UPD2. The latest values of both Vmax and Vmin, i.e. Vmaxnew and Vminnew are used for calculating the offset value $\Delta f_k$, which consists of their average value. This calculation takes place within CALC. The offset is subsequently subtracted within a subtraction device SUB from the incoming data or symbol stream. A corrected symbol stream, denoted $S_k$ is thereby obtained for provision to a first output terminal OUT1 of OCD. The offset value $\Delta f_k$ is as well delivered by the calculating device CALC, to a second output terminal OUT2 of OCD. This second output terminal OUT2 is coupled to a control input terminal INF of the digital downconversion device DDC of the demodulator DM, as can be observed from FIG. 2. The digital downconversion device DDC, will use the value of the offset $\Delta f_k$ for directly correcting the value of the downconversion carrier frequency of the local oscillator LO. In other embodiments of the demodulator, such as the one shown in FIG. 1, the frequency offset value can be fed back to the analog downconversion device ADD, where it will also be used for tuning the value of the local oscillator.

In the embodiment of the offset detection and correction device OCD depicted in FIG. 4, four more variables are further used for refining the above described method of offset detection. Two of these variable, denoted $\tau_{1H}$ and $\tau_{1T}$ are respectively stored within UPD1, whereas two others, $\tau_{2H}$ and $\tau_{2T}$, are stored in UPD2. These variables are used in a variant of the method of offset detection which is especially useful in the presence of noisy signals, where for instance a short disturbance might cause Vmax to increase too much beyond the normal limits of the signal. Therefore the update devices are equipped with a track- and hold function on Vmax and Vmin; which are each characterised by the aforementioned two time constants. Following equations apply:

If $Vk$>Vmax, then Vmaxnew=Vmax+$\tau_{1T}$.($Vk$-Vmax)

Else Vmaxnew=Vmax+$\tau_{1H}$.($Vk$-Vmax)

Similarly

If $Vk$<Vmin, then Vminnew=Vmin+$\tau_{2T}$.($Vk$-Vmin)

Else Vminnew=Vmin+$\tau_{2H}$.($Vk$-Vmin)

By using these expressions, the tracking operation of Vmax and Vmin will be more tolerant to noise. The values of the tracking parameters $\tau_{1T}$ and $\tau_{2T}$ are usually stored within the update devices, may be user programmable, and must be chosen as a compromise between the tracking speed and the expected noise magnitude. The value of the hold parameters $\tau_{2T}$ and $\tau_{2H}$ must be chosen as a function of the largest number of consecutive "1" or "0" values that is expected.

Remark that other implementations are possible for realising the described method for offset detection and correction.

It is further important to notice that also in the receiver of FIG. 2, the presence of a logic device for relating the demodulated signal value with the originally transmitted baseband symbol or bits, is mandatory. Such a device is to be coupled between OCD and the output terminal OUT. In order not to overload the drawing, this device is not shown in FIG. 2.

While the principles of the invention have been described above in connection with specific apparatus, it is to be clearly understood that this description is made only by way of example and not as a limitation on the scope of the invention, as defined in the appended claims.

What is claimed is:

1. Method for demodulating an analog FSK signal (FSKin), said method including a step of downconverting said analog FSK signal (FSKin) into a lower frequency analog signal (IIf,QIf;IIf,QIf) characterised in that said downconverting step is followed by a digitisation step on said lower frequency analog signal such as to obtain an in-phase component (Id) and an orthogonal phase component (Qd) of a digital baseband signal, and a step of multiplying a current sample (Id(k);Id$_i$) of said inphase component with a previous sample (Qd(k−1);Qd$_{i−1}$) of said orthogonal phase component and subtracting the product thereof from the product obtained by multiplying a current sample of said orthogonal phase component (Qd(k); Qd$_i$) with a previous sample (Id(k−1); Id$_{i−1}$) of said inphase component, thereby obtaining a result (R(k); R$_i$) which is proportional to a digital baseband symbol, whereby said current and said previous samples of said inphase and said orthogonal phase components are spaced apart by the digital baseband signal period.

2. Method according to claim 1 characterised in that
said current sample ($Id_i$) and said previous sample ($Id_{i-1}$) of said inphase component are spaced apart by an integer fraction (n) of said digital baseband signal period,
said current sample ($Qd_i$) and said previous sample ($Qd_{i-1}$) of said orthogonal phase component are spaced apart by said integer fraction,
whereby the steps of said method are repeated, thereby obtaining consecutive values of said result ($R_i$),
and whereby said integer number of consecutive values of said result ($R_i$) are subsequently added, such as to obtain subsequent sums ($S_i$).

3. Method according to claim 2 characterised in that
a data stream, at the rate of said digital baseband signal multiplied by
said integer, and consisting of said subsequent sums ($S_i$), is sampled at said digital baseband signal rate such as to obtain a stream of demodulated baseband symbols ($V_k$).

4. Method according to claim 1 characterised in that an offset value ($\Delta f_k$) of said demodulated baseband symbols ($V_k$) is determined, by tracking the minimum and maximum values of said stream of said demodulated baseband symbols ($V_k$), after which step said offset value ($\Delta f_k$) is subtracted from said demodulated baseband symbol for thereby obtaining corrected symbols ($S_k$).

5. Method according to claim 1 characterised in that
said digitisation step consists of an analog/digital conversion followed by a digital downconversion such as to obtain said inphase component (Id) and said orthogonal phase component (Qd).

6. Method according to claim 4 characterised in that said offset value ($\Delta f_k$) is used during said digital downconversion step by controlling the value of a numerical controlled oscillator to compensate carrier frequency offset.

7. Demodulator (DM'; DM) for demodulating an analog FSK signal (FSKin), said demodulator (DM'; DM) including an input terminal (IN'; IN) for receiving said analog FSK signal (FSKin) and an output terminal (OUT'; OUT) for providing a stream of demodulated baseband symbols (R(k); $V_k$), an analog downconversion device (ADD'; ADD) coupled to said input terminal (IN';IN) and adapted to derive from said analog FSK signal a lower frequency analog signal (IIf,QIf;IIf,QIf) characterised in that said demodulator (DM';DM) further includes
a digitisation device (DD';DD) adapted to derive from said lower frequency analog signal (IIf,QIf;IIf,QIf) successive samples of an in-phase component and an orthogonal phase component of a digital baseband signal and to deliver, at predetermined instances related to the digital baseband signal rate, a current sample (Id(k);$Id_i$) and a previous sample (Id(k−1); $Id_{i-1}$) of said in-phase component and a current sample (Qd(k);$Qd_i$) and a previous sample (Qd(k−1); $Qd_{i-1}$) of said orthogonal component to respective output terminals of said digitisation device (DD';DD),
processor means (P';P), adapted to calculate a first product of said
previous sample (Id(k−1); $Id_{i-1}$) of said in-phase component with said current sample (Qd(k);$Qd_i$) of said orthogonal phase component, to calculate a second product of said previous sample (Qd(k−1); $Qd_{i-1}$) of said orthogonal phase component with said current sample (Id(k);$Id_i$) of said in-phase component, to calculate the difference between said first product and said second product and to deliver the result (R(k);$R_i$) of said subtraction to an output terminal of said processor means which is coupled to said output terminal (OUT';OUT) of said demodulator (DM';DM).

8. Demodulator (DM) according to claim 7 characterised in that
said digitisation device (DD) is further adapted to deliver said current said current sample ($Id_i$) and said previous sample ($Id_{i-1}$) of said inphase component, and said current sample ($Qd_i$) and said previous sample ($Qd_{i-1}$) of said orthogonal phase component, at an integer multiple of said rate of said digital baseband signal,
said demodulator (DM) further includes a shift register (SR) adapted to store successive values ($R_{i-n}, \ldots, R_i$) of said result and to deliver said successive values to a summation device (SUM) of said demodulator (DM), said summation device (SUM) being adapted to add said successive values of said result, and to provide the sum thereof (Si) to an output terminal of said summation device which is coupled to said output terminal (OUT) of said demodulator device (DM).

9. Demodulator (DM) according to claim 8 characterised in that
said demodulator (DM) further includes a clock recovery device (CRD) which is adapted to sample, at the rate of said digital baseband signal, samples from the data stream consisting of successive values of said sum (Si), and to deliver said samples to said output terminal (OUT) of said demodulator (DM) as a stream of digital baseband symbols (Vk).

10. FSK receiver (FSKR) including
a receiver input terminal (INR) for receiving an analog FSK signal (FSKin)
a receiver output terminal (OUTR)
a demodulator (DM';DM) having an input terminal (IN';IN) coupled to said input terminal (INR) of said FSK receiver, said demodulator (DM';DM) being adapted to derive from said analog FSK signal (FSKin), a stream of demodulated baseband symbols (R(k);Vk) for provision to an output terminal (OUT';OUT) of said demodulator (DM';DM) which is coupled to said receiver output terminal (OUTR) characterised in that said demodulator device (DM';DM) is further adapted in accordance to claim 7.

11. FSK receiver (FSKR) according to claim 10 characterised in that
said FSK receiver (FSKR) further includes an offset correction device
(OCD) coupled between said output terminal (OUT';OUT) of said demodulator device (DM';DM) and said receiver output terminal (OUTR), said offset correction device being adapted to determine an offset ($\Delta f_k$) of said demodulated baseband symbols (R(k); $V_k$), by tracking the minimum and maximum value of said stream of demodulated baseband symbols, and to subtract said offset ($\Delta f_k$) from said demodulated baseband symbols (R(k);$V_k$) for thereby obtaining corrected digital baseband symbols ($S_k$) for provision to an output terminal (OUT1) of said offset correction device (OCD) which is coupled to said output terminal (OUTR) of said FSK receiver.

12. FSK receiver (FSKR) according to claim 10 characterised in that
said analog downconversion device (ADD) is adapted to deliver a
pair of orthogonal components (IIf,QIf) of said lower frequency analog signal
said digitisation device (DD) includes a pair of analog/digital converters, each of which is adapted to receive a respective one of said pair of lower frequency analog signals (QIf,IIf), and to respectively convert it to a digital lower frequency signal (QIfd,IIfd), for delivery to a digital downconversion device (DDC) included in said digitisation device, which is adapted to derive from said pair of digital lower frequency signals (QIfd,IIfd) and from a local oscillator frequency signal ($Q_{LO}$,$I_{LO}$) provided by a numerically controlled oscillator (LO), said successive samples of said inphase ($I_{di}$) and said orthogonal phase ($Q_{di}$) component of said digital baseband signal, said digitisation device (DD) further includes memory means (M1,M2), adapted to temporarily store said successive samples of said orthogonal phase ($Q_{di}$), resp. said inphase ($I_{di}$) component of said digital baseband signal, for providing previous samples of said orthogonal ($Q_{di-1}$), resp. said inphase ($I_{di-1}$), digital baseband signal.

13. FSK receiver according to claim 11 characterised in that said offset correction device (OCD) includes a second output terminal (OUT2) coupled to a control input terminal (INF) of said digital downconversion device (DDC), said offset correction device (OCD) is further adapted to deliver the value of said offset ($\Delta f_k$) to said second output terminal (OUT2), said numerically controlled oscillator (LO) of said digital downconversion device (DDC) being further adapted to tune the frequency of the output reference signal of said numerically controlled oscillator (LO).

* * * * *